United States Patent [19]
Colman et al.

[11] Patent Number: 5,699,259
[45] Date of Patent: Dec. 16, 1997

[54] INVENTORY CONTROL PROCEDURE

[75] Inventors: Anthony W. Colman, Campbell; Jeffrey A. Janes, Fremont, both of Calif.

[73] Assignee: Siemens Business Communication Systems, Inc., Santa Clara, Calif.

[21] Appl. No.: 397,445

[22] Filed: Mar. 1, 1995

[51] Int. Cl.$^6$ .................................................. G06F 17/60
[52] U.S. Cl. .......................... 364/468.05; 364/468.13; 395/208; 395/228
[58] Field of Search .................................. 364/403, 402, 364/468.05, 468.06, 468.07, 468.09, 468.1, 468.13; 395/208, 209, 228, 229

[56] References Cited

U.S. PATENT DOCUMENTS

| | | | |
|---|---|---|---|
| 4,648,023 | 3/1987 | Powell | 364/156 |
| 4,669,047 | 5/1987 | Chucta | 364/468 |
| 5,101,352 | 3/1992 | Rembert | 364/401 |
| 5,204,821 | 4/1993 | Inui et al. | 364/468 |
| 5,287,267 | 2/1994 | Jayaraman et al. | 364/403 |
| 5,325,304 | 6/1994 | Aoki | 364/468 |
| 5,440,480 | 8/1995 | Costanza | 364/401 |
| 5,528,489 | 6/1996 | Asahara et al. | 364/402 |

Primary Examiner—Reba I. Elmore
Assistant Examiner—Brian C. Oakes

[57] ABSTRACT

An inventory control procedure which supplies materials at various stations along an assembly line without providing excess amounts of these materials. In particular, an embodiment of the present invention is an inventory control procedure which operates in conjunction with an inventory control system to manage a manufacturing process along an assembly line, which assembly line includes (a) assembly stations, (b) stock areas which are associated with the assembly stations for storing associated materials for use in an assembly function which is performed at the assembly station, and (c) information apparatus for transmitting supply information to and for receiving order information from the inventory control system, which inventory control procedure includes the steps of: (a) the inventory control system sending the order information to one or more of the information apparatus at the assembly stations; (b) receiving the order information at the one or more information apparatus at the assembly stations; (c) performing the assembly functions at the one or more assembly stations using the associated material which are stored at the associated stock areas; (d) entering supply information relating to associated materials at the associated stock areas which are used in the assembly function into the information apparatus at the assembly stations; (e) transmitting the supply information to the inventory control system; (f) the inventory control system determining whether to order associated materials on the basis of data and placing an order; (g) entering delivery information relating to associated materials at the associated stock areas into the information apparatus at the assembly stations; and (h) transmitting the delivery information to the inventory control system.

5 Claims, 1 Drawing Sheet

INVENTORY CONTROL PROCEDURE

TECHNICAL FIELD OF THE INVENTION

The present invention relates to an inventory control procedure use in for assembling equipment, which inventory control procedure supplies materials at various stations along an assembly line without providing excess amounts of these materials.

BACKGROUND OF THE INVENTION

In assembling equipment using an assembly line procedure, one must have available a suitable supply of materials at various assembly stations along the assembly line so that work flows smoothly and without interruption due to a shortage of materials. Ideally, the suitable supply of materials must not be so large that great expense is entailed in an oversupply of materials at the various assembly stations. This is a well known problem in manufacturing and past solutions have relied on linear forecasting models to help determine appropriate amounts of materials to store at the various assembly stations. These solutions have failed in that they have resulted in purchasing and storing larger amounts of materials than are actually required by the assembly line procedure. As a consequence, the prior art methods require excessive inventories to support assembly of equipment.

In light of the above, there is a need in the art for an inventory control procedure which supplies materials at various stations along an assembly line without providing excess amounts of these materials.

SUMMARY OF THE INVENTION

Advantageously, embodiments of the present invention solve the above-identified need in the prior art and provide an inventory control procedure which supplies materials at various stations along an assembly line without providing excess amounts of these materials. In particular, an embodiment of the present invention is an inventory control procedure which operates in conjunction with an inventory control system to manage a manufacturing process along an assembly line, which assembly line is comprised of(a) assembly stations, (b) stock areas which are associated with the assembly stations for storing associated materials for use in an assembly function which is performed at the assembly station, and (c) information apparatus for transmitting supply information to and for receiving order information from the inventory control system, which inventory control procedure comprises the steps of: (a) the inventory control system sending the order information to one or more of the information apparatus at the assembly stations; (b) receiving the order information at the one or more information apparatus at the assembly stations; (c) performing the assembly functions at the one or more assembly stations using the associated material which are stored at the associated stock areas; (d) entering supply information relating to associated materials at the associated stock areas which are used in the assembly function into the information apparatus at the assembly stations; (e) transmitting the supply information to the inventory control system; (f) the inventory control system determining whether to order associated materials on the basis of data and placing an order; (g) entering delivery information relating to associated materials at the associated stock areas into the information apparatus at the assembly stations; (h) transmitting the delivery information to the inventory control system; wherein the step of the inventory control system determining whether to order associated materials on the basis of data and placing the order comprises the steps of: determining whether the amount of material at a stock area is at or less than ROP and, in that case, placing an order where ROP is determined in accordance with the following formula:

ROP=Greater of (SDK of DGR)+((OGT+SPT+IT)−1) *DGR+Buffer Stock where: SDR is a statistical daily rate; DGK is a daily going rate; OGT is an order generation time; SPT is a supplier prep time; IT is an in-transit time; and Buffer Stock includes an amount of additional material which acts as a buffer for exceptions.

In a preferred embodiment of the present invention, DGR is based on a forecast of demand; OCT is a time between reaching ROP and placing an order in the hands of a supplier, either in-house or outside; SPT is a time required by a supplier to prepare an order for shipment; IT is an in-transit time from a supplier's dock to an assembly station.

BRIEF DESCRIPTION OF THE FIGURE

The FIGURE shows, in pictorial form, an assembly line which operates in accordance with the inventive inventory control procedure.

DETAILED DESCRIPTION

Figure 1:
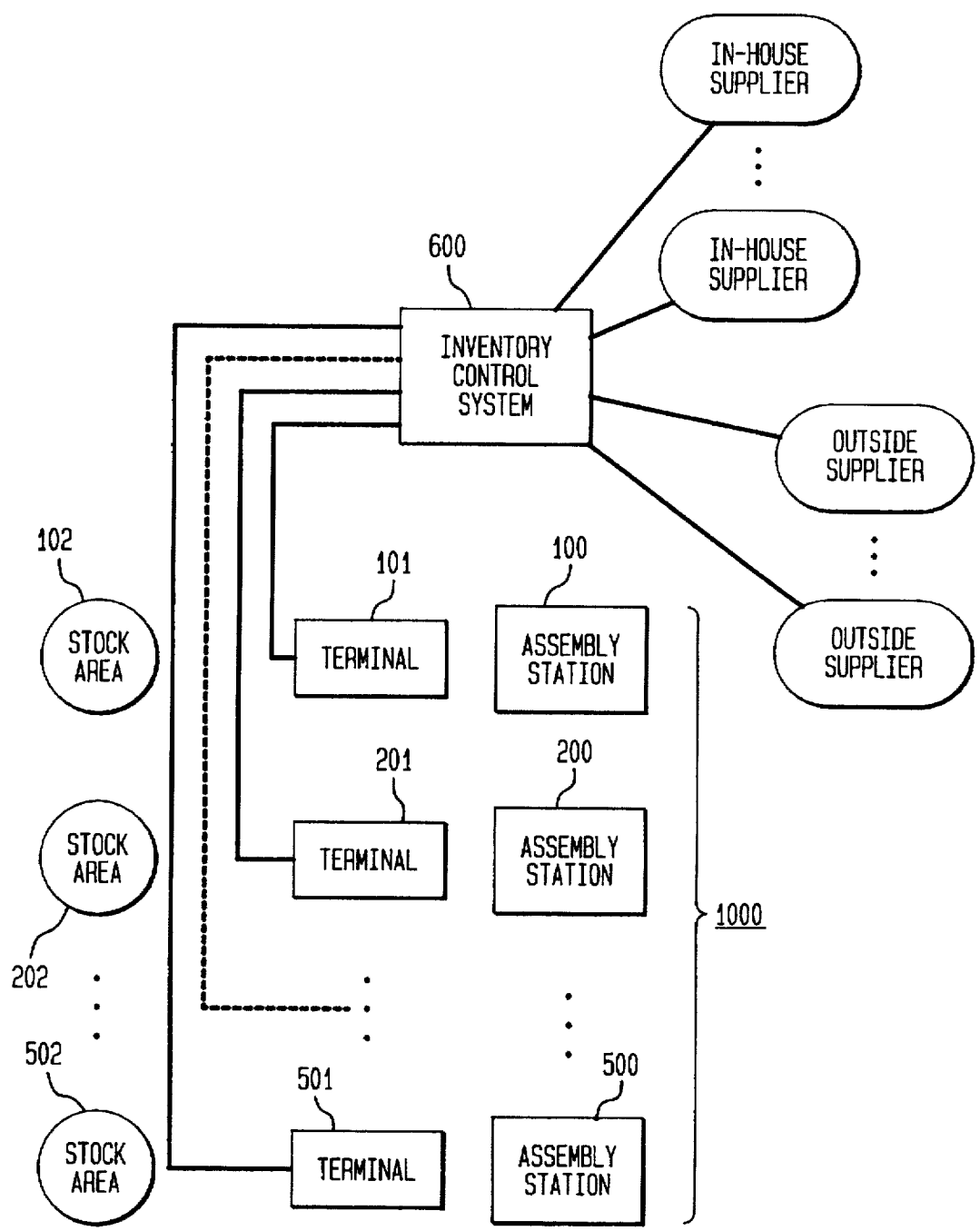

The FIGURE shows, in pictorial form, assembly line 1000 which operates in accordance with the inventive inventory control procedure. As shown in the FIGURE, assembly line 1000 is comprised of assembly stations 100–500. Further, as shown in the FIGURE, all of assembly stations 100–500 have associated materials which are stored at stock areas 102–502, respectively. The associated materials are used for a particular assembly function which is performed at the particular assembly station. Still further, as shown in the FIGURE, all of assembly stations 100–500 can communicate with inventory control system 600 by means, for example, of terminals 101–501, respectively. Information is entered into terminals 101–501, respectively, at assembly stations 100–500, respectively, either automatically or manually. Further, inventory control system 600 sends information to assembly stations 100–500, respectively, which information is communicated to personnel at the assembly stations by means of terminal 101–501. The information entered into terminals 101–501 comprises: (a) the mount of a particular type of material which is being consumed in the assembly function performed at the particular assembly station and (b) the mount of the particular type of material that is being delivered to the stock area for that assembly station. As is known in the art, the type and mount of material that is being consumed or delivered may be entered manually by, for example, keyboard entry or it may be entered automatically by a laser bar code reader that scans a bar code which is imprinted on packaging or on labels affixed to materials at the assembly station. However, those of ordinary skill in the art should understand that the present invention is not limited by the manner in which the information is communicated to inventory control system 600. The information sent to terminals 101–501 from inventory control system 600 comprises, among other things, an order to perform an assembly function to produce materials which are to be delivered to other assembly stations along assembly line 1000. The materials which are produced at assembly stations, other than the final assembly station, are stored in the stock areas of assembly stations along assembly line 1000.

Let us consider one example of the manner in which an embodiment of the inventive inventory control procedure operates as a means of explaining the present invention. Assume that inventory control system 600 receives an order to manufacture an apparatus. In response to the order, inventory control system transmits an order to terminal 101 at assembly station 100 to perform its assembly function. In a preferred embodiment, terminal 101 includes a display, for example, a CRT display with a hard copy printout so that an order to begin manufacture may be communicated to assembly station 100. Assume for the purposes of this example that the assembly function performed at assembly station 100 requires one piece of material stored at stock area 102. Information is entered at terminal 101, for example, by an operator, and transmitted to inventory control system 600 which states that one piece of material has been consumed in the assembly function performed in satisfying the order at assembly station 100. In response to this information, inventory control system 600 determines whether an order must be placed to replenish the materials at stock area 102 and, if an order is to be placed, the amount of materials which are to be requested in the order. Then, in accordance with this decision, inventory control system 600 places an order to replenish the material at stock area 102 from an in-house manufacturing facility or from an outside supplier. The order may be placed by a number of methods. For example, in a preferred embodiment of the present invention, an order may be faxed directly from inventory control system 600 to the in-house manufacturing facility or to the outside supplier. Of course, as those of ordinary skill in the art can readily appreciate, an order for materials to be delivered to an assembly station which is in the middle of the assembly line may entail an order to carry out an assembly function at an assembly station further up the assembly line.

After the assembly function is completed at assembly station 100, the equipment produced at assembly station 100 is delivered to a stock area, for example, stock area 202, for use in the assembly function which is performed at, for example, assembly station 200. This procedure is repeated until the entire apparatus is assembled after assembly station 500.

In accordance with the present invention, an assembly function at a particular assembly station is carried out only when the particular material produced by that assembly function is needed in accordance with the above-described decision of inventory control system 600. Advantageously, an assembly function is authorized or an order placed for material to an in-house manufacturing facility or an outside supplier only when there is an immediate need, i.e., when the material has been pulled from a stock area at an assembly station.

In accordance with the present invention, inventory control system 600 places an order for a particular material whenever the material at the stock area associated with a particular assembly station reaches its ReOrder Point (ROP). The system will take into account any outstanding replenishment orders and will only order more material if the combined amount on hand plus the amount on order is at, or less, than ROP. As described above, in a preferred embodiment of the inventive inventory control procedure, whenever a material reaches ROP, inventory control system 600 automatically faxes a copy of an order to a vendor.

In accordance with the present invention, ROP is a single element which is used to determine the amount of material to be maintained in a stock area at an assembly station. The optimum amount for ROP is determined in accordance with the following formula $$ROP = Greater(SDR, DGR) + ((OGT + SPT + IT) - 1) * DGR + Buffer\ Stock$$

where: SDR is a statistical daily rate; DGR is a daily going rate; OGT is an order generation time; SPT is a supplier prep time; and IT is an in-transit time. For example, assume the following: SDR=10; DGR=8; OCT=1; SPT=1; IT=3; and Buffer Stock=0. For this case, ROP=42.

The term Buffer Stock includes an amount of additional material which acts as a buffer for exceptions to the standard formula to account, for example, for high failure rates, vendor/transportation problems, and so forth. Daily Going Rate (DGR) for each item of material is based on a forecast of demand for, for example, the next six (6) months divided by the number of working days in that period of time. Order Generation Time (OGT) is the time between reaching ROP and placing an order in the hands of a supplier. Supplier Prep Time (SPT) is the time required by a supplier to prepare an order for shipment. In-Transit Time (IT) is the in-transit time from a supplier's dock to an assembly station.

In accordance with the present invention, ReOrder Quantity (ROQ) is determined using standard packaging sizes as a key element. Further, in accordance with a preferred embodiment of the present invention, all material is ordered in standard packaging size lots only. For example, for some types of material, ROQ is calculated at 5 times DGR, rounded up to the standard packaging size. For other classes of material, ROQ is calculated as 20 times DGR, rounded off to the standard packaging size and adjusted to physical capacity constraints at the stock area of the assembly station.

In accordance with the present invention, KBL is the sum of ROP and ROQ and is the maximum amount of material that should ever be at the stock area of an assembly station. Most times, the amount at the stock area will be lower than KBL since there will be additional material consumed between the time ROP is reached and the ROQ amount is received at the assembly station.

The following describes the method for achieving a value of SDK which is referred to as the 97% Statistical Daily Kate (97% SDK). The 97% SDK is obtained by collecting daily usage history over a number of days. These daily usage numbers are then sorted from highest to lowest usage. The daily usage number occurs on the day which is from the top of the period (in days) is the 97% SDK. This is explained in the following example. In a typical 3-month period, there are 65 working days during which one would normally expect to pull parts from assembly stations. 97% of 65 is 63.05, therefore, we would use the third highest daily number as the 97% SDK

| Ranked Usage | Ranked Days | % of days in period | |
|---|---|---|---|
| 34 | 65 | 100% | |
| 29 | 64 | 98% | |
| 21 | 63 | 97% | ← 97th percent of usage days in |
| 19 | 62 | 95% | period. Ranked usage for the |
| 18 | 61 | 94% | period was 21 on that day. |
| 18 | 60 | 92% | Therefore, the 97% SDR will be 21. |
| 17 | 59 | 91% | |
| ↓ | ↓ | ↓ | |
| 0 | 1 | 0% | |

Those skilled in the art will recognize that the foregoing description has been presented for the sake of illustration and description only. As such, it is not intended to be exhaustive or to limit the invention to the precise form disclosed. For example, modifications and variations are possible in light of the above teaching which are considered to be within the spirit of the present invention.

What is claimed is:

1. An inventory-control procedure which operates in conjunction with an inventory control system to manage a manufacturing process along an assembly line, which assembly line is comprised of (a) assembly stations, (b) stock areas which are associated with the assembly stations for storing associated materials for use in an assembly function which is performed at the assembly station, and (c) information apparatus for transmitting supply information to and for receiving order information from the inventory control system, which inventory control procedure comprises the steps of:

the inventory control system sending the order information to one or more of the information apparatus at the assembly stations;

receiving the order information at the one or more information apparatus at the assembly stations;

performing the assembly functions at the one or more assembly stations using the associated material which are stored at the associated stock areas;

entering supply information relating to associated materials at the associated stock areas which are used in the assembly function into the information apparatus at the assembly stations;

transmitting the supply information to the inventory control system;

the inventory control system determining whether to order associated materials and placing an order;

entering delivery information relating to associated materials at the associated stock areas into the information apparatus at the assembly stations;

transmitting the delivery information to the inventory control system;

wherein the step of the inventory control system determining whether to order associated materials and placing the order comprises the steps of;

determining whether the amount of material at a stock area is at or less than ROP and, in that case, placing an order where ROP is determined in accordance with the following formula:

ROP=Greater of (SDR or DGR)+((OCT+SPT+IT)−1) *DGR+Buffer Stock where: SDR is a statistical daily rate; DGR is a daily going rate; OCT is an order generation time; SPT is a supplier prep time; IT is an in-transit time; and Buffer Stock includes an amount of additional material which acts as a buffer for exceptions.

2. The inventory control procedure of claim 1 wherein DGK is based on a forecast of demand; OCT is a time between reaching ROP and placing an order in the hands of a supplier, either in-house or outside; SPT is a time required by a supplier to prepare an order for shipment; IT is an in-transit time from a supplier's dock to an assembly station.

3. The inventory control procedure of claim 2 wherein the step of placing an order comprises faxing an order to a supplier.

4. The inventory control procedure of claim 3 wherein the step of receiving information from the inventory control system comprises receiving the information on a visual display apparatus.

5. The inventory control procedure of claim 4 wherein the step of entering information comprises entering the information by way of a bar code reader.

* * * * *